US012789328B2

(12) United States Patent
Thompson

(10) Patent No.: US 12,789,328 B2
(45) Date of Patent: Nov. 10, 2026

(54) COMPACT COARSE/FINE PRECISION ADJUSTMENT HAND TOOL

(71) Applicant: BAE SYSTEMS Information and Electronic Systems Integration Inc., Nashua, NH (US)

(72) Inventor: David E. Thompson, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 316 days.

(21) Appl. No.: 18/638,377

(22) Filed: Apr. 17, 2024

(65) Prior Publication Data

US 2025/0326091 A1 Oct. 23, 2025

(51) Int. Cl.
*B25B 17/00* (2006.01)
*B25B 21/00* (2006.01)

(52) U.S. Cl.
CPC .............. *B25B 17/00* (2013.01); *B25B 21/00* (2013.01)

(58) Field of Classification Search
CPC ......... B25B 15/02; B25B 17/02; B25B 21/00; B25B 21/002; B25B 21/007; B25B 23/0021; B25B 23/0035; B25B 23/14; B25B 23/1405; B25B 23/141; B25B 23/142; B25B 23/1427; B25B 23/147; B25B 23/16; B25G 1/005; B25G 1/085; B25G 1/125; B25F 5/001; B25F 5/02
See application file for complete search history.

(56) References Cited

U.S. PATENT DOCUMENTS

| | | | | | |
|---|---|---|---|---|---|
| 5,033,336 | A * | 7/1991 | Chia-Tsai | B25B 17/02 | 81/57.3 |
| 6,012,359 | A * | 1/2000 | Lin | F16H 1/28 | 81/57.12 |
| 2008/0282846 | A1 * | 11/2008 | Sharifi-Mehr | B25B 17/02 | 81/436 |
| 2009/0183603 | A1 * | 7/2009 | Kozak | B23B 51/009 | 81/53.2 |
| 2013/0161041 | A1 * | 6/2013 | Junkers | B25F 5/001 | 173/176 |
| 2024/0082999 | A1 * | 3/2024 | Izutsu | B25B 21/00 | |

FOREIGN PATENT DOCUMENTS

CN 201419340 Y * 3/2010 ........... B25B 23/147

* cited by examiner

*Primary Examiner* — Robert J Scruggs
(74) *Attorney, Agent, or Firm* — Maine Cernota & Curran; Gary McFaline

(57) ABSTRACT

A hand-held tool enables accurate, micro-radian rotation of a control element. The tool includes an adjustment shaft extending distally from an adjusting element, and a reducer within a housing that mechanically couples the adjustment shaft to a distal tool shaft. Rotating the tool as a whole directly rotates the tool shaft, while rotating only the adjustment shaft causes the reducer to apply a smaller rotation to the tool shaft according to a reduction factor that can be between 16 and 1024. The adjusting element can be a manually rotated knob, or a motor, such as a stepper motor, actuated by a switch, such as a momentary contact, rocker, or pushbutton switch. The reducer can include one or more planetary gear stages, and/or one or more strain wave gear stages. The tool can have a length not more than 5 inches and a diameter not more than 0.6 inches.

18 Claims, 9 Drawing Sheets

COMPACT COARSE/FINE PRECISION ADJUSTMENT HAND TOOL

STATEMENT OF GOVERNMENT INTEREST

Portions of the present invention may have been made in conjunction with Government funding under contract number 18 C 0291, and there may be certain rights to the Government.

FIELD

The disclosure relates to tools, and more particularly to hand-held rotational adjustment tools.

BACKGROUND

Mechanical systems, such as opto-mechanical systems, sometimes require fine or micro-fine mechanical adjustment of one or more sensors, optical elements, or other adjustable elements so as to precisely position and/or align the elements, for example during initial construction and/or for subsequent reconfiguration or realignment as needed. These adjustments can require rotations of control elements that are accurate to within one hundred microradians, and in some instances to within ten microradians or less.

Sometimes it is not possible, not practical, or otherwise not desirable to automate fine mechanical adjustments. In such cases, adjustment by a manually operated tool is required. Often, it can be important for the tool to be light in weight and limited in size, so that a user can comfortably hold the tool in the user's hand, and manually control it with precision. Unfortunately, however, it can be very difficult for a user to effect precise, micro-fine rotations using a small, hand-held tool.

What is needed, therefore, is a hand-held tool that enables a user to rotate a control element with micro-fine rotational accuracy.

SUMMARY

A hand tool is disclosed that enables a user to rotate a control element with micro-fine rotational accuracy. The disclosed tool includes a housing containing a "reducer" that converts angular rotations of a proximal adjusting element into smaller rotations of a distal tool shaft having a control element at its distal tip. Manual rotation of the tool as a whole provides coarse rotation of the control element, while actuation of only the adjusting element, while the housing is held fixed, provides finely controlled rotation of the control element. In embodiments, the adjusting element is a manually rotatable adjustment knob, while in other embodiments the adjusting element is a locally activated motor, such as a stepper motor activated by a switch provided on the exterior of the tool.

The disclosed hand tool comprises a cylindrical housing having inner and outer walls surrounding a central axis, a tool shaft coaxial with the central axis of the housing and extending from a distal end of the housing, a control element mechanically cooperative with a distal end of the tool shaft, a substantially cylindrical adjusting element coaxial with the central axis of the housing and proximate to a proximal end of the housing, the adjusting element being fixed to an adjustment shaft that is coaxial with the central axis of the housing and extends from the adjusting element into the housing, and a reducer coupling the adjustment shaft to the tool shaft within the housing, the reducer being coaxial with the central axis of the housing and rotationally fixed to the housing, rotation of the tool shaft relative to the housing thereby requiring rotation of the adjusting element, and vice versa.

Rotation in unison of the housing and the adjusting element results in direct rotation of the tool shaft and the control element, while a first rotation of the adjusting element relative to the housing results in a second rotation of the tool shaft relative to the housing that is smaller than the first rotation, the second rotation being equal to the first rotation divided by a reduction factor of the reducer.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A hand tool is disclosed that enables a user to rotate a control element with micro-fine rotational accuracy. In embodiments, the rotations of the control element can be accurate to within one hundred microradians, and in some embodiments to within ten microradians or less.

Figure 1:
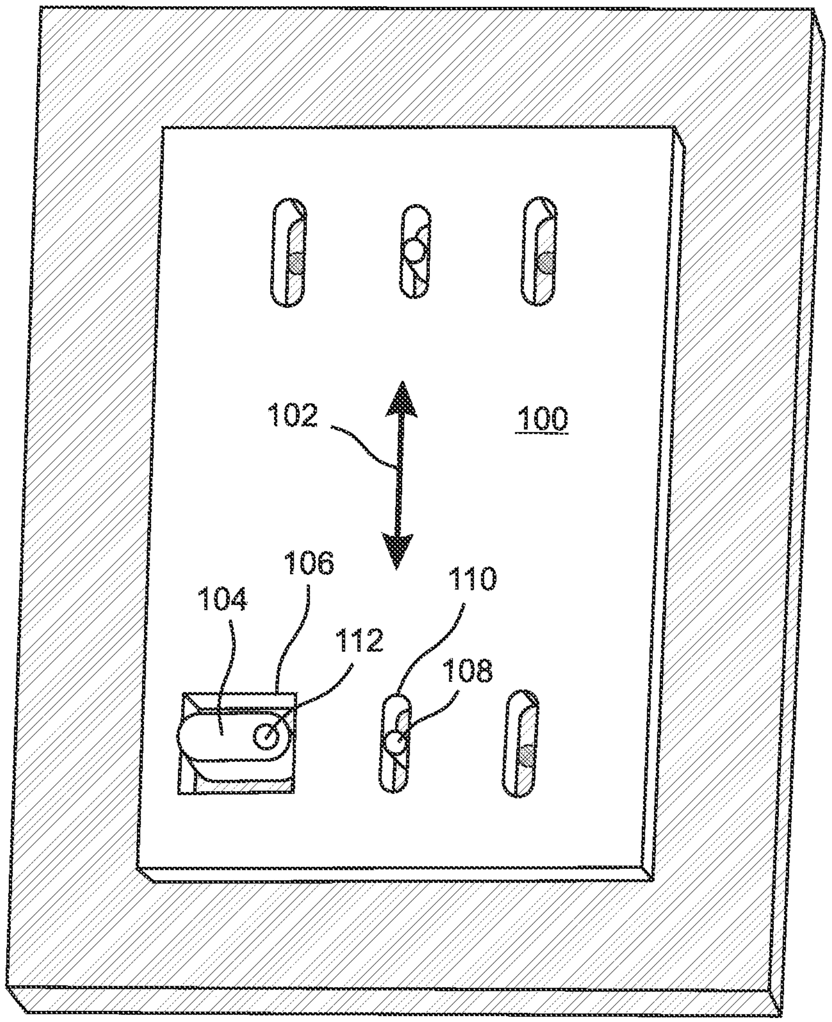
FIG. 1 is a perspective front view of an adjustable element that is translated, but not rotated, by rotating a cam within a slot, where the cam is a control element in an embodiment of the present disclosure.

The term "adjustable element" is used herein to refer to any element of a system that requires adjustment of its orientation and/or translational position by the control element of the disclosed hand tool. For example, FIG. 1, illustrates how the rotation of a control element 104 can be used to adjust the vertical positioning of an adjustable element 100, without rotating the adjustable element. In the illustrated example, the control element is a cam 104 that is provided at the distal end of a tool shaft 206 (shown in FIG. 2A). By rotating the cam 104 within a slot 106, the adjustable element 100 is translated vertically 102, while it is prevented from rotating by pegs 108 inserted into additional slots 110.

For clarity of illustration, the shaft 206 that rotates the cam 104 is omitted from FIG. 1, with only the location 112 of the shaft 206 being indicated on the cam 104. In other embodiments, the tool shaft 206 is terminated by a control element that imparts a rotation to the adjustable element. For example, instead of a cam 104, the control element can be a flat screwdriver tip, a Phillips head screwdriver tip, a hexagonal driving tip, or a socket configured to accept connection thereto of a removable drive bit.

Figure 2A:
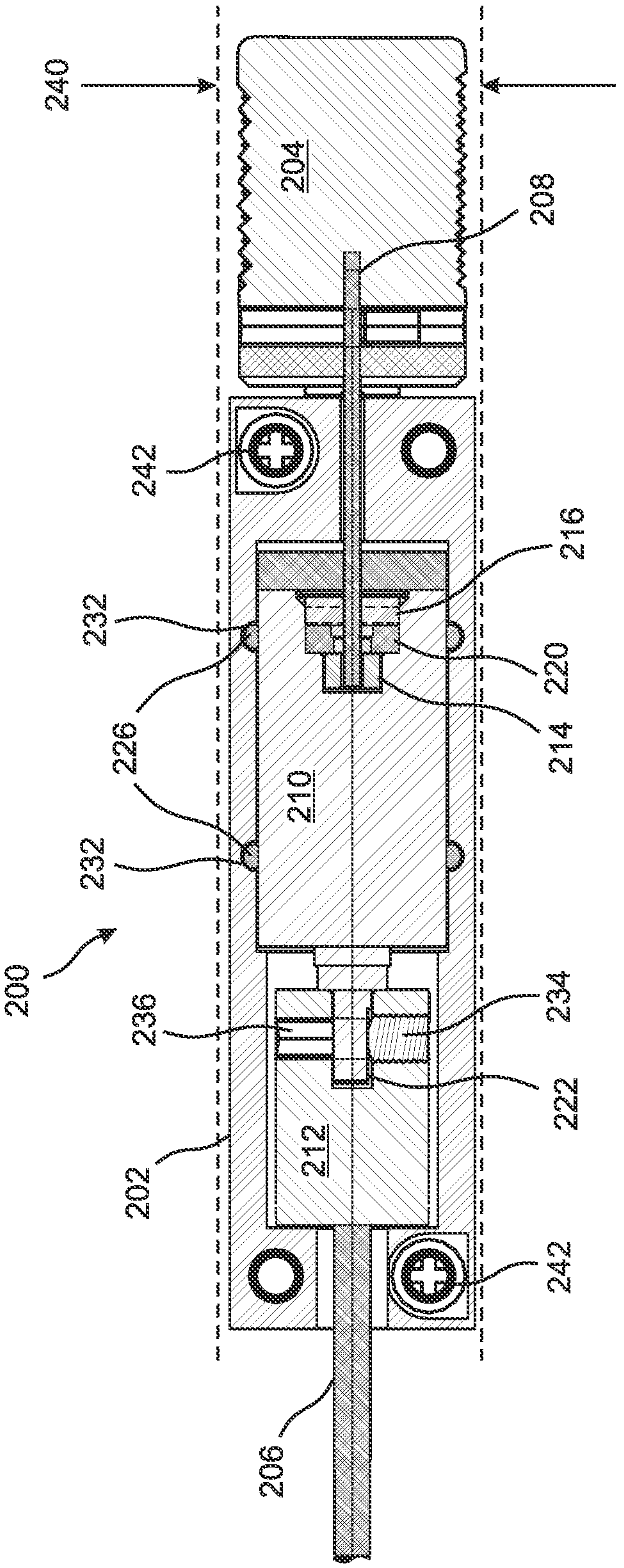
FIG. 2A is a sectional view from the side, drawn to scale, of an embodiment of the present disclosure in which the adjusting element is a manually rotated knob.
Figure 2B:
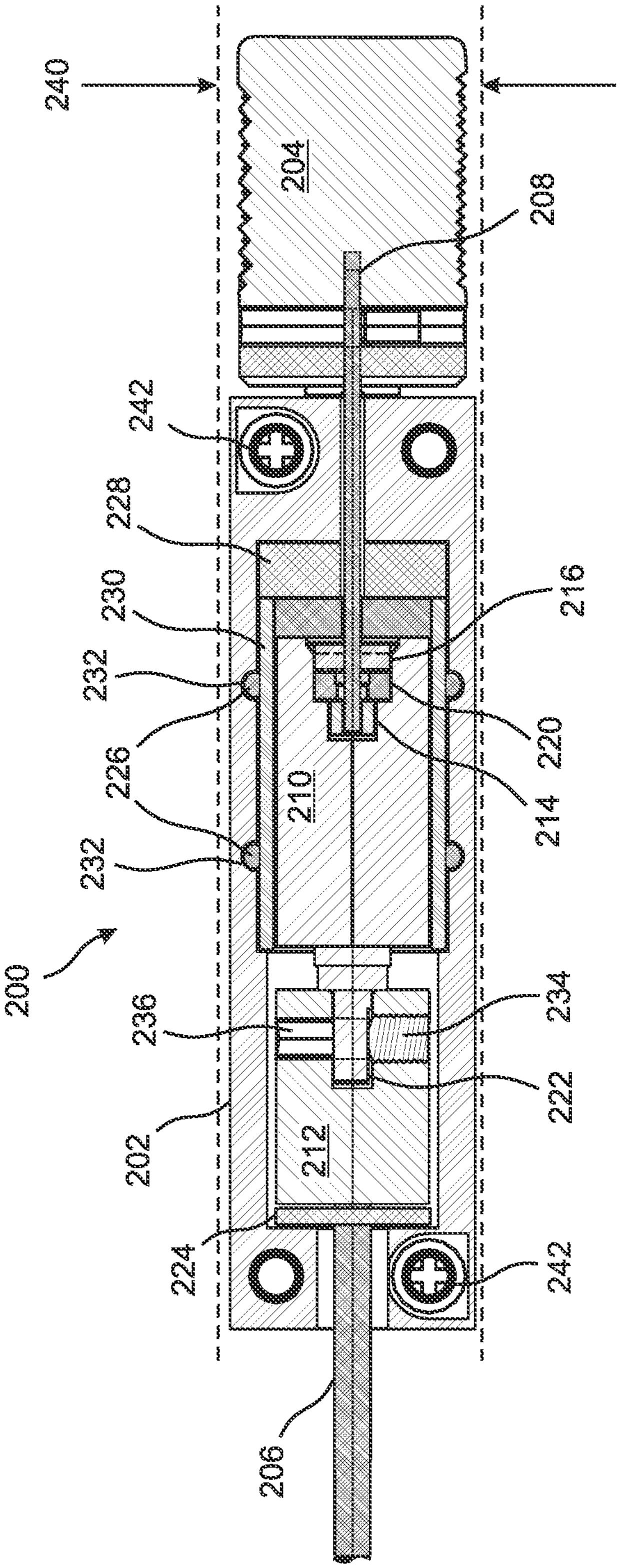
FIG. 2B is a sectional view from the side, drawn to scale, of an embodiment that is similar to FIG. 2A, but in which the reducer is adapted to the inner diameter and length of the housing by annular spacers.
Figure 3:
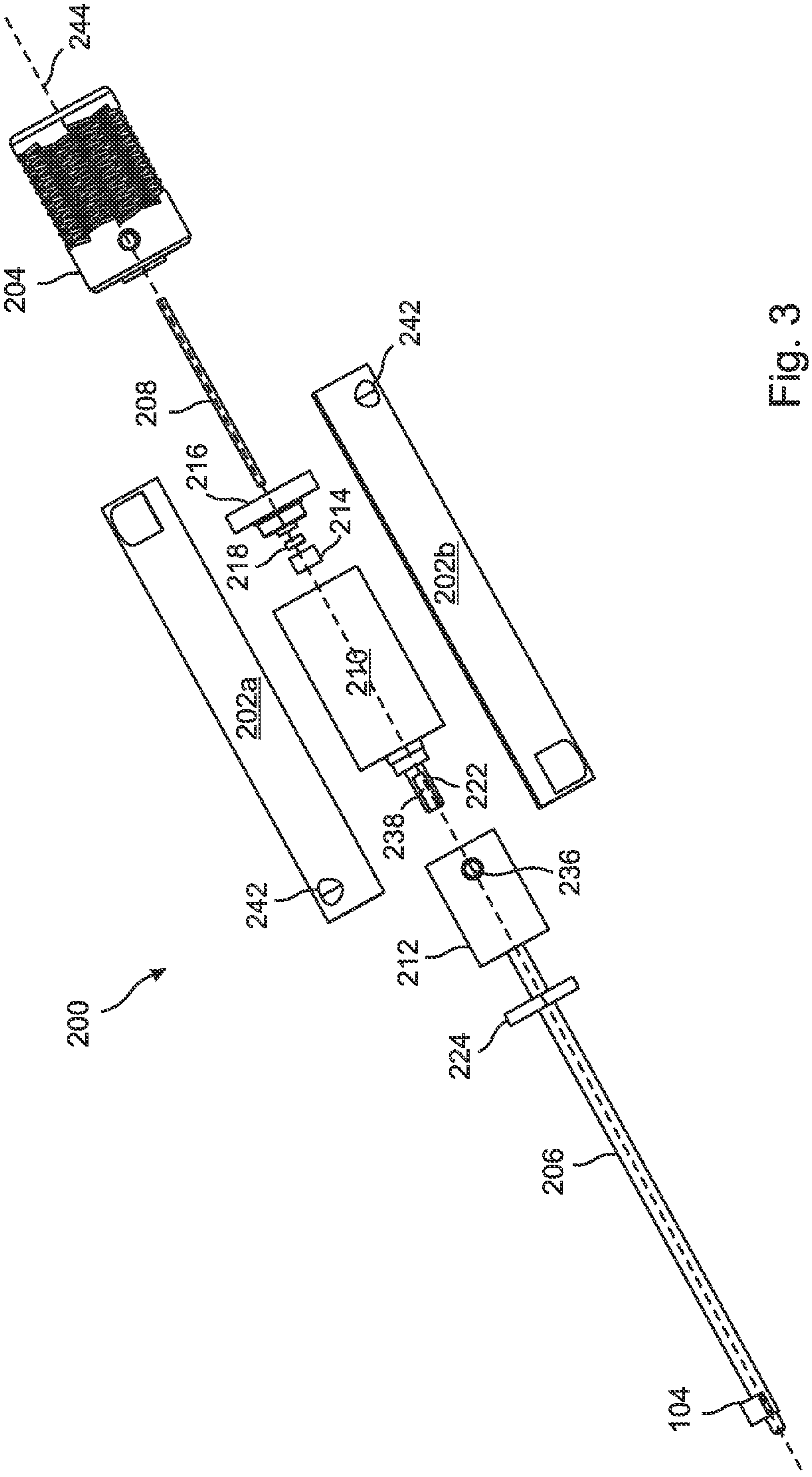
FIG. 3 is an exploded view, drawn to scale, of the embodiment of FIG. 2A.

With reference to the sectional views from the side of FIGS. 2A and 2B, and the exploded view of FIG. 3, the present disclosure is a hand tool 200 that is configured to enable a user to rotate a control element with micro-fine rotational accuracy. In the illustrated embodiment, the tool 200 comprises a hollow cylindrical housing 202 having inner and outer walls and a central axis 244. A tool shaft 206 extends coaxially from a distal end of the housing 202, and terminates in a control element 104. A substantially cylindrical adjusting element 204 coaxial with the central axis 224 of the housing 202 is proximate to a proximal end of the housing 202. The adjusting element 204, which in the illustrated embodiment is an adjustment knob 204, is fixed to an adjustment shaft 208 that is also coaxial with the central axis 244 of the housing 202 and extends distally from the adjusting element 204 into the housing 202.

The adjustment shaft 208 is cooperative with a reducer 210 that is contained within the housing 202. The reducer 210 comprises a plurality of gears that mechanically convert angular rotations of the adjusting element 204 and adjustment shaft 208 into smaller rotations of the tool shaft 206. The reducer 210 is fixed to the housing 202, so that it cannot rotate relative to the housing 202. In the illustrated embodiment, a pair of O-rings 226 are inserted into O-ring channels 232 provided in the inner wall of the housing 202 which frictionally fix the reducer 210 to the housing. In other embodiments, a gasket, an adhesive, a set screw, and or one or more other fixing mechanism(s) is/are used to ensure that the reducer 210 cannot rotate relative to the housing 202.

According to the present disclosure, a first rotation of the adjustment shaft 208 results in a second rotation of the tool shaft 206 that is equal to the first rotation divided by a reduction factor that is determined by the mechanical configuration of the reducer 210. In various embodiments, the reduction factor of the reducer 210 is 16, 64, 256, or 1024. In the illustrated embodiment, the adjustment shaft 208 is coupled to the input of the reducer 210 by a pinion gear 214 that is supported by a retainer 216, a spacer 218, and a bearing 220 (see FIG. 3). A reducer output shaft 222 is coupled to the tool shaft 206 by an output coupler 212. In the illustrated embodiment, the output coupler 212 is a cylinder that is able to rotate within the housing 202, and is attached to the tool shaft 206 by welding, by an adhesive, or by an interference fit. The output coupler 212 includes a radial threaded channel 236 into which a set screw 234 is deployed, such that the set screw 234 presses against a flattened surface 238 provided on the output shaft 222 of the reducer 210.

The gears of the reducer 210 are configured such that rotation of the tool shaft 206 requires rotation of the adjustment shaft 208, and vice versa. This ensures that rotation of the housing 202 and adjusting element 204 in unison directly rotates the tool shaft 206 and control element 104. Manual rotation of the tool 200 as a whole thereby provides coarse rotation of the tool shaft 206, and control element, while rotation of only the adjusting element 204, while the housing 202 is prevented from rotating, provides finely controlled rotation of the tool shaft 206 and control element 104.

It can be seen in FIGS. 2A-3 that the tool 200 in the illustrated embodiment is substantially confined within a cylindrical profile 240, which is approximately equal to the diameter of the housing 202, and that the diameter of the adjusting element 204, in particular, does not exceed the diameter of the housing 202.

The tool 200 can be easily held and manually actuated by a user, even if the user is wearing gloves. For example, the user can hold the housing 202 with three fingers of a hand, while rotating the adjustment knob 204 with the thumb and index finger of the same hand. Or, the user can hold the housing 202 with one hand, while turning the adjustment knob 204 with the other hand.

In embodiments, the diameters of the housing 202 and of the adjusting element 204 are both 2 inches or less, such that the housing 202 and adjusting element are small enough to be comfortably held and operated by a single hand of a user, while being large enough to enable accurate use of the tool 200 even if the user has limited dexterity, for example if the user is wearing a bulky glove. In some embodiments, which may be more suitable for users who are not wearing gloves, or who are wearing very thin gloves, the diameters of the housing 202 and of the adjustment knob 204 are both one inch or less. And in various embodiments, the diameters of the housing 202 and of the adjustment knob 204 are both 0.6 inches or less. The small diameters of these embodiments reduce their weight, making them easier to position and manipulate precisely, and also facilitate insertion of the housing 202 into areas of limited accessibility, for example if access to a control element is limited, and it is inconvenient or counterproductive to extend the length of the tool shaft 206.

In embodiments, the reduction factor of the tool 200 can be changed by disassembling the housing 202 and exchanging the reducer 210. In some embodiments where a plurality of reducers 210 having different reduction factors are to be interchanged, the reducers 210 have different diameters and/or lengths. For example, if the reducers have different numbers of internal gear stages that are substantially identical to each other, the diameters of the reducers 210 in these embodiments will be the same, while the lengths will vary according to the number of gear stages. The reducer having the largest reduction factor will comprise the greatest number of gear stages, and hence will have the greatest length.

With continuing reference to FIG. 2B, differences in reducer lengths can be accommodated by inserting or removing one or more annular reducer length spacers 224, 228 that surround the tool shaft 206 and/or the adjustment shaft 208 within the housing 202. If the reducers 210 differ in diameter, this can be accommodated by inserting or removing one or more reducer diameter spacers 230 that surround the reducer 210. Accordingly, in embodiments, the housing 202 is configured to accommodate the reducer 210 having the greatest length and diameter, and spacers 224 are used when reducers 210 having smaller dimensions are installed.

In embodiments, with reference to FIG. 3, the housing 200 is divided into two mating halves 202*a*, 202*b* that are held together by two screws 242, thereby facilitating exchange of the reducer 210 and/or addition and removal of spacers 224, 228, 230. This approach can be useful, not only for a user wishing to adapt the tool 200 to different applications by exchanging reducers 210, but also in manufacturing, so that a single size of housing 202 can be maintained in inventory and used in assembling tools 200 having different reduction factors.

Figure 4:
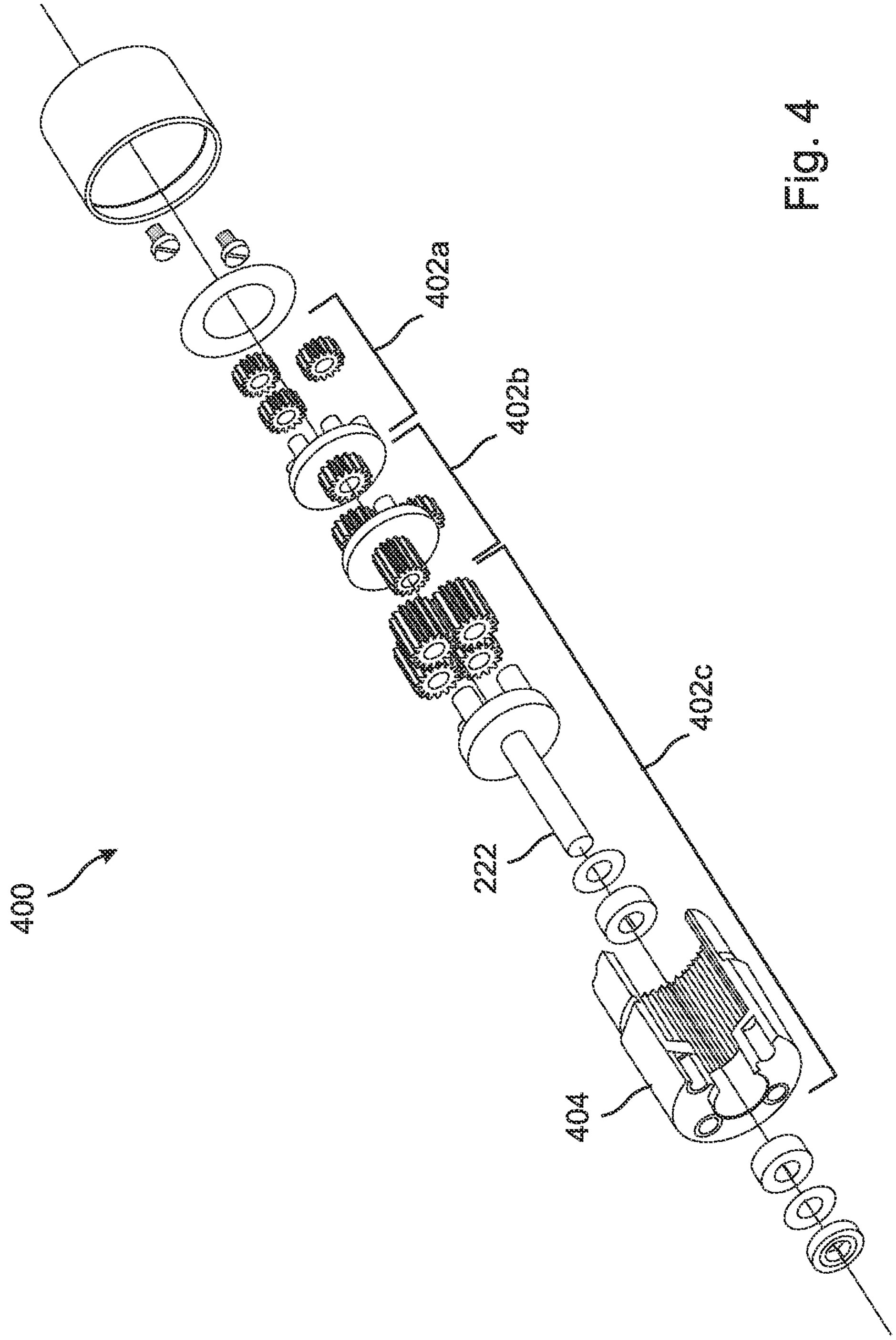
FIG. 4 is an exploded view of a reducer that includes planetary gear stages, according to an embodiment of the present disclosure.

With reference to FIG. 4, in some embodiments the reducer 400 comprises one or more planetary gear stages 402*a-c* that contribute to the reduction factor of the reducer 400. The embodiment of FIG. 4 comprises three planetary gear stages 402*a*, 402*b*, 402*c*. The first planetary gear stage 402*a* engages with the pinion 214 at the end of the adjustment shaft 208 (shown in FIG. 3). The last planetary gear stage 402*c* terminates in a gear ring 404, and is coupled to the reducer output shaft 222 (shown in FIG. 3).

Figure 5:
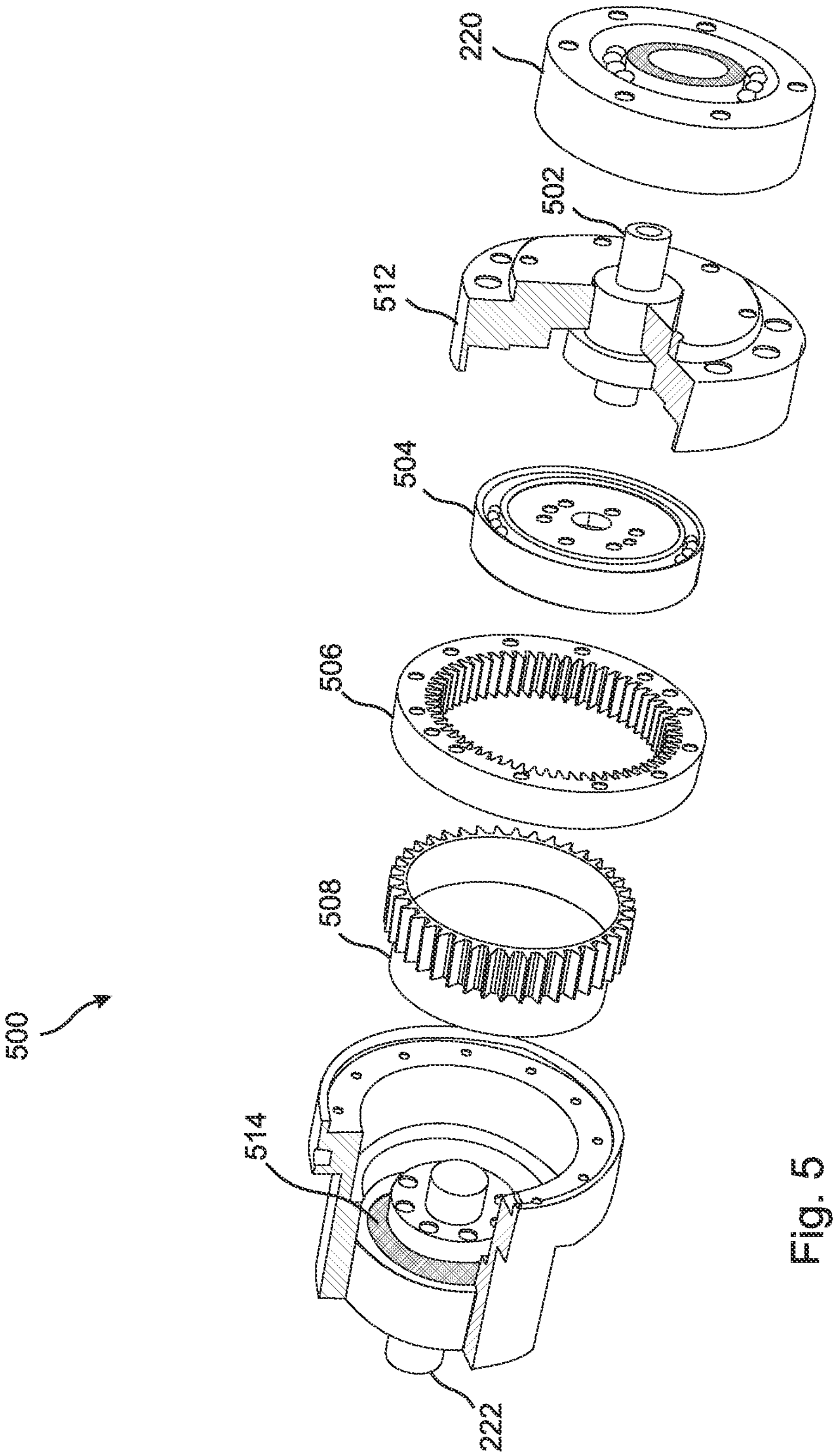
FIG. 5 is an exploded view of a reducer that includes a strain wave gear stage, according to an embodiment of the present disclosure.

With reference to FIG. 5, in various embodiments the reducer 500 incorporates one or more strain wave gear stages that contribute to the reduction factor of the reducer 500. In the embodiment of FIG. 5, the reducer 500 includes only one strain wave gear stage. The input shaft 502, which is supported by an input bearing 220 and surrounded by an input coupler 512 is coupled to the adjustment shaft 208 (show in FIG. 3). Rotation of the input shaft 502 by the adjustment shaft 208 causes an elliptical wave generator 504 to be flexed, and thereby to engage with the fixed ring gear 506. Due to a difference in the number of teeth included in the flexible spline 508 and the ring gear 506, the interaction between the flexible spline 508 and the ring gear 506 causes the flexible spline 508 to rotate at a rate that is proportionally reduced as compared to the rotation rate of the input shaft 502. The flexible spline 508 is coupled to an output shaft 222, which is supported by an output bearing 514.

Figure 6A:
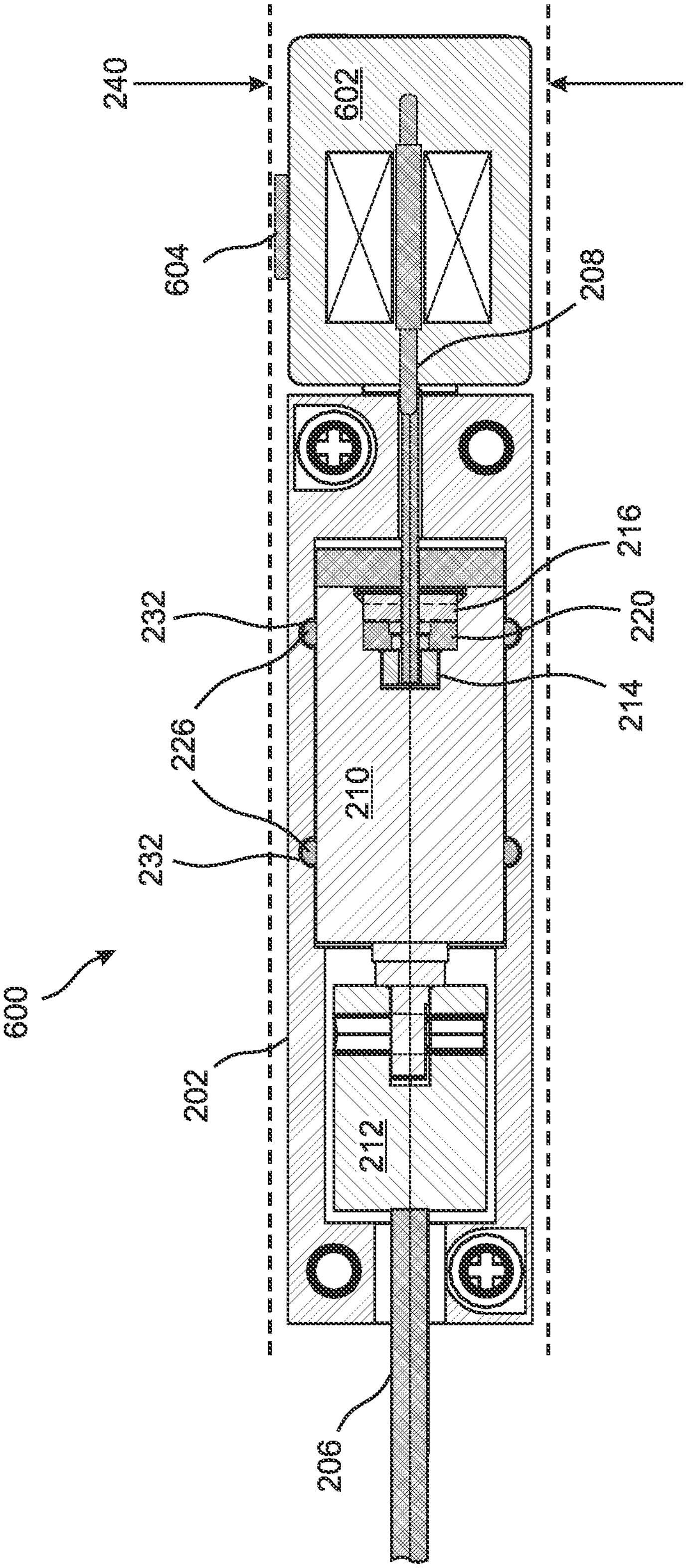
FIG. 6A is a sectional view from the side, drawn to scale, of an embodiment of the present disclosure in which the adjusting element is a stepper motor controlled by a momentary contact pushbutton switch that extends radially from a location on the adjusting element near the proximal end of the tool.

As discussed above with reference to FIGS. 2A, 2B, and 3, in some embodiments the adjusting element 204 is an adjustment knob 204 that is configured for manual rotation by the user. With reference to FIG. 6A, in other embodiments 600 the adjusting element 602 comprises an adjustment motor 608, such as a stepper motor, which is activated by an externally accessible switch 604 provided on the housing 202, or on the exterior of the adjusting element 602. In the illustrated embodiment, the switch 604 is a momentary contact pushbutton switch 604. In similar embodiments, the switch 604 is a rocker switch, a sliding switch, or a toggling pushbutton switch.

Figure 6B:
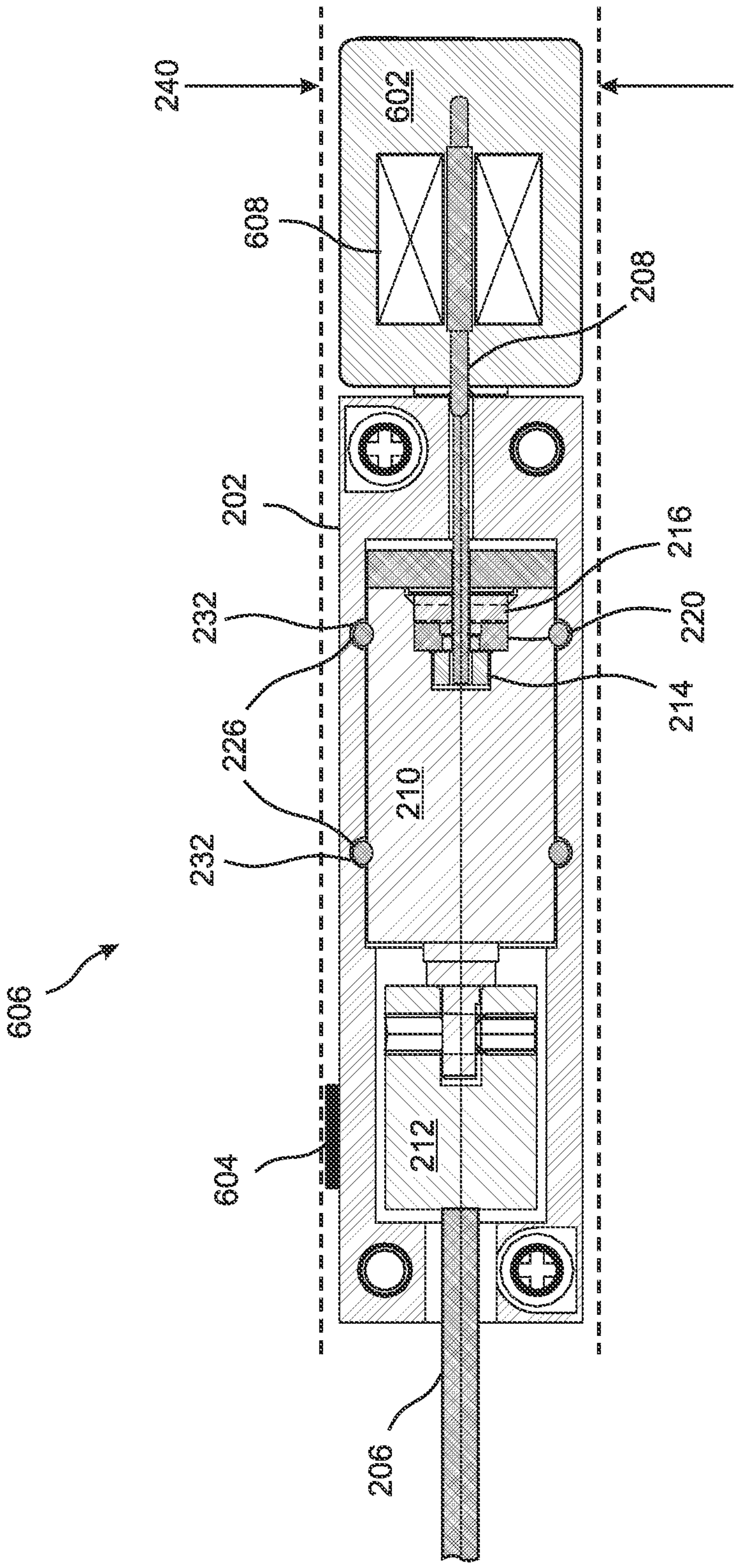
FIG. 6B is a sectional view from the side, drawn to scale, of an embodiment of the present disclosure in which the adjusting element is a stepper motor controlled by a momentary contact pushbutton switch that extends radially from a location on the housing near the tool shaft.
Figure 6C:
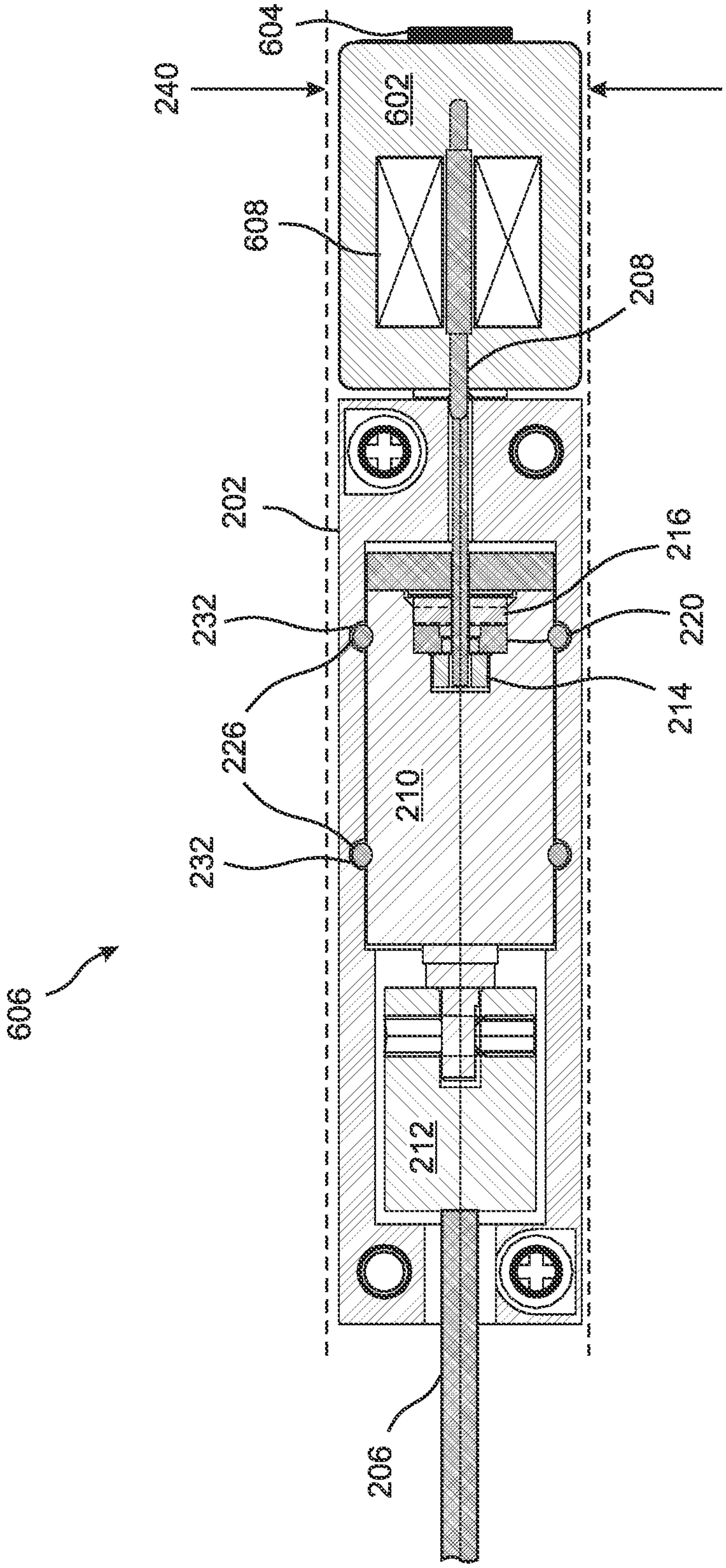
FIG. 6C is a sectional view from the side, drawn to scale, of an embodiment of the present disclosure in which the adjusting element is a stepper motor controlled by a momentary contact pushbutton switch extending axially from a proximate end of the adjusting element.

In the illustrated embodiment 600 of FIG. 6A, a user can hold the housing 202 with the fingers of one hand, and can actuate the switch 604, as needed, with the thumb of the same hand, thereby leaving the other hand free to perform other tasks. With reference to FIG. 6B, in similar embodiments 606, the switch 604 is provided on the housing 202 proximate the tool shaft 206, and the housing 202 can be held by three fingers and a thumb of a user's hand, while the index finger of the same hand actuates the switch 604. With reference to FIG. 6C, in still other embodiments the switch 604 extends axially from a proximal end wall of the adjusting element 602, such that the housing 202 and adjusting element 602 can be held by a user's fingers, while the switch 604 is actuated by the thumb of the same hand.

The motor 608 can be powered by batteries (not shown), which can be rechargeable. In embodiments, rotation of the adjustment shaft 208 by a stepper motor 602 has the advantage of enabling precisely calibrated rotations of the control element 104. For example, each press of the switch 604 can result in a defined number of "step" advancements of the stepper motor 602, such as one step of rotation per switch actuation, which results in a calibrated, accurate, and reproducible rotation of the tool shaft 206 and the control element 100 according to the number of times that the switch 604 is pressed.

In the illustrated embodiments of FIGS. 6A-6B, the switch 604 extends outward from the housing 202 or adjusting element 602, thereby slightly increasing the diameter of the cylindrical "profile" 240 of the tool 600. In similar embodiments, the switch is flush with the outer wall of the housing 202 or of the motor 620.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−$^{2}$% of the stated value (or range of values), +/−$^{5}$% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

To the extent that the present disclosure has utilized the term “invention” in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A tool, comprising:

a cylindrical housing having inner and outer walls surrounding a central axis;

a tool shaft coaxial with the central axis and extending from a distal end of the housing;

a control element mechanically cooperative with a distal end of the tool shaft;

a substantially cylindrical adjusting element coaxial with the central axis and proximate to a proximal end of the housing, the adjusting element being fixed to an adjustment shaft that is coaxial with the central axis and extends from the adjusting element into the housing; and a reducer coupling the adjustment shaft to the tool shaft within the housing, the reducer comprising a strain wave gear stage having an input shaft coupled to the adjustment shaft, an elliptical wave generator, a fixed ring gear, and a flexible spline coupled to a reducer output shaft, wherein a pair of O-rings inserted into O-ring channels provided in the inner wall of the housing to frictionally fix the reducer to the housing and wherein an output coupler couples the reducer output shaft to the tool shaft, the output coupler comprising a cylinder attached to the tool shaft and having a radial threaded channel receiving a set screw that presses against a flattened surface of the reducer output shaft, the reducer being rotationally fixed to the housing, and configured such that rotation of the tool shaft relative to the housing requires rotation of the adjustment shaft, and vice versa;

wherein rotation in unison of the housing, the adjustment shaft, and the adjusting element results in direct rotation of the tool shaft and the control element;

and wherein a first rotation of the adjustment shaft relative to the housing results in a second rotation of the tool shaft relative to the housing that is smaller than the first rotation, the second rotation being equal to the first rotation divided by a reduction factor of the reducer.

2. The tool of claim 1, wherein a diameter of the adjusting element is less than or equal to a diameter of the cylindrical housing.

3. The tool of claim 2, wherein the tool is substantially contained within a cylindrical profile having a diameter that is equal to the diameter of the housing.

4. The tool of claim 1, wherein the housing comprises a pair of opposed housing halves, the housing halves being reversibly coupled to each other.

5. The tool of claim 1, wherein the reducer is a first reducer and the reduction factor is a first reduction factor, and wherein the tool further comprising a second reducer that can be installed within the housing in place of the first reducer, the second reducer having a second reduction factor that is less than the first reduction factor.

6. The tool of claim 5, wherein the second reducer is smaller in length than the first reducer, and wherein the tool further includes a reducer length spacer that can be installed within the housing coaxial with the central axis, thereby adapting the second reducer to a length of the housing.

7. The tool of claim 5, wherein the second reducer is smaller in diameter than the first reducer, and wherein the tool further includes a reducer diameter spacer configured to adapt the second reducer to the inner wall of the housing, such that when the second reducer is installed within the housing the second reducer is surrounded by the reducer diameter spacer, and is rotationally fixed to the housing.

8. The tool of claim 1, wherein the control element is symmetric about the central axis, and is configured to engage with and to mechanically rotate an adjustable element.

9. The tool of claim 1, wherein the control element is asymmetric about the central axis, and is configured to engage with and to mechanically translate an adjustable element.

10. The tool of claim 1, wherein the control tip comprises at least one of:

a flat screwdriver tip;

a Phillips head screwdriver tip;

a hexagonal driving tip;

a socket configured to accept connection thereto of a removable drive bit; and a cam.

11. The tool of claim 1, wherein the reduction factor is one of 32, 64, 128, 256, 512, and 1024.

12. The tool of claim 1, wherein a diameter of the housing is less than or equal to two inches.

13. The tool of claim 1, wherein a diameter of the housing is less than or equal to one inch.

14. The tool of claim 1, wherein a diameter of the housing is less than or equal to 0.6 inches.

15. The tool of claim 1, wherein the adjusting element comprises a manually rotatable adjustment knob that is coaxial with the central axis of the housing and fixed to the adjustment shaft.

16. The tool of claim 1, wherein the adjusting element comprises a motor that is configured to rotate the adjustment shaft, and an externally accessible switch that, when actuated, causes the motor to rotate the adjustment shaft.

17. The tool of claim 16, wherein the motor is a stepper motor.

18. The tool of claim 17, wherein actuation of the externally accessible switch causes the stepper motor to advance through a defined number of steps, thereby enabling the first rotation to be predictable and reproducible according to a number of times that the externally accessible switch is actuated.

* * * * *